United States Patent [19]

Ikeda et al.

[11] 4,435,120
[45] Mar. 6, 1984

[54] ARM FOR A PROGRAMME CONTROLLED MANIPULATOR

[75] Inventors: Junichi Ikeda, Tokyo; Iwao Ohtani, Inagi; Noriyuki Utsumi, Yokohama; Shinichi Nojima, Tokyo, all of Japan

[73] Assignee: Tokico Ltd., Kawasaki, Japan

[21] Appl. No.: 354,048

[22] Filed: Mar. 2, 1982

[30] Foreign Application Priority Data

Mar. 17, 1981 [JP] Japan .............................. 56-38093[U]

[51] Int. Cl.³ .......................................... B66C 23/00
[52] U.S. Cl. ...................................... 414/735; 74/98; 74/409; 74/421 R; 414/4
[58] Field of Search ...................... 414/1, 4, 730, 735; 74/469, 414, 421 R, 98, 409

[56] References Cited

U.S. PATENT DOCUMENTS

| | | | |
|---|---|---|---|
| 2,397,126 | 3/1946 | Buhrendorf | 74/409 |
| 3,985,238 | 10/1976 | Nakura et al. | 414/4 X |
| 4,107,948 | 8/1978 | Molaug | 64/2 P |

*Primary Examiner*—Robert J. Spar
*Assistant Examiner*—D. W. Underwood
*Attorney, Agent, or Firm*—Cushman, Darby & Cushman

[57] ABSTRACT

An elephant nose type arm for a programme controlled manipulator, comprises gears meshing with each other, connecting members for connecting the gears to each other and actuator for rotating the one of the gears to bend said arm.

9 Claims, 5 Drawing Figures

ARM FOR A PROGRAMME CONTROLLED MANIPULATOR

This invention relates to a manipulator (elephant nose type) arm suitable to the use in industrial robots or manipulators.

In a programme controlled manipulator comprising a support member rotatably mounted to a base block, an inflexible arm rotatably mounted to the support member and a working tool such as a paint spray nozzle rotatably attached at the top end of the arm, and adapted to apply coating on a work piece using this nozzle set to predetermined positions by the rotation of the support member and the arm, it is difficult to perform coating operation within narrow spaces or for those work pieces having complicated shapes. Accordingly, the manipulator of this type has usually been employed for the coating on the outer surfaces of work pieces having relatively simple shapes such as flat plates or boxes. By the way, although the coating operation for the work pieces of complicated shapes and the operation in the narrow spaces can be facilitated to some extent by attaching a nozzle by way of a bendable arm to the top end of an inflexible arm or a base block, the structure of joints, that is, connecting portions is extremely complicated and no sufficient degree of bending in the arm can be obtained in the known bendable arms, whereby it is difficult to extend the working range so much.

This invention has been made in view of the foregoing problems and the object thereof is to provide a bendable manipulator arm in which the structure of connecting portions can be simplified and the working range can be extended.

Another object of this invention is to provide a bendable manipulator arm capable of decreasing backlashes in the connecting portions thereby preventing the lowering in the positioning accuracy caused by such backlashes.

A further object of this invention is to provide a bendable manipulator arm which can suitably be applied also to a so-called teaching-playback type manipulator.

This invention provides a manipulator arm comprising a stationary gear mounted to a base block, a movable gear meshing with the stationary gear, a driving means causing the movable gear to move while meshing it with the stationary gear and a working tool provided to the movable gear.

According to the manipulator arm of this invention, desired degree of arm bending can be obtained and the bending performance can optionally be changed with ease by adjusting the gear ratio in the gear coupling.

This invention will now be described more in details referring to preferred embodiments thereof in conjunction with the accompanying drawings, by which the foregoing and other objects, as well as the features of this invention will be made more clear. However, this invention is no way limited to those embodiments described below but can be modified or altered by those skilled in the art, which are also encompassed within the scope of this invention.

Figure 1:
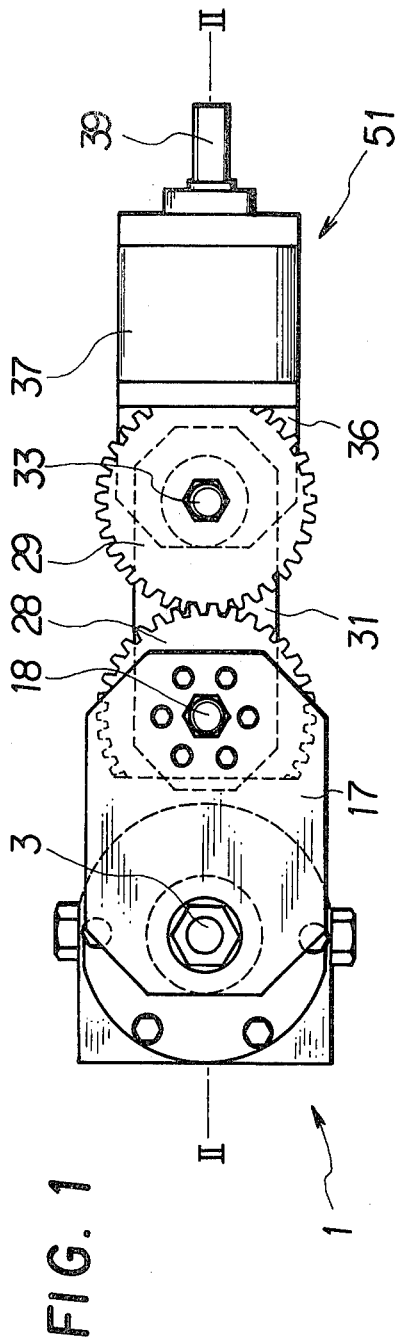
FIG. 1 is a side elevation view of a preferred embodiment according to this invention.
Figure 2:
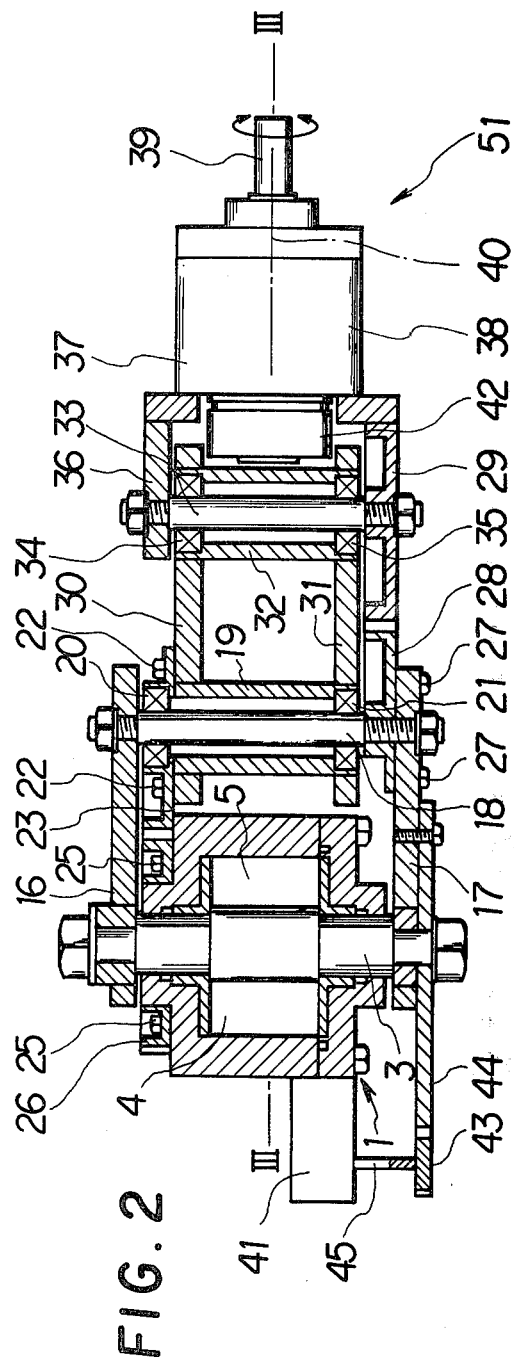
FIG. 2 is a cross sectional view taken along line II—II shown in FIG. 1.
Figure 3:
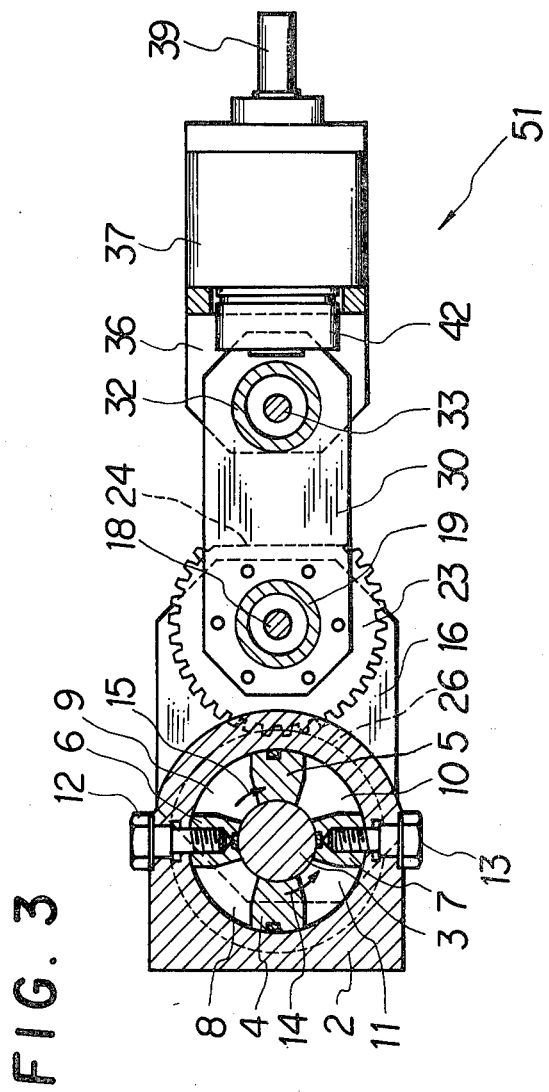
FIG. 3 is a cross sectional view taken along line III—III shown in FIG. 2.

Referring to FIG. 1 through FIG. 3, a casing 2 of a hydraulic rotary actuator 1 is secured to a base block or inflexible arm (not shown) and a rotational shaft 3 passing through the casing 2 has vanes 4 and 5 as partition members secured thereto. The vanes 4 and 5 together with other vanes 6 and 7 as partition members divide the space within the casing 2 into four chambers 8 to 11. The vanes 6 and 7 are secured to the casing 2 by means of bolts 12 and 13. When hydraulic fluid under pressure is charged to the chambers 8 and 10 and discharged from the chambers 9 and 11, the vanes 4 and 5 and the shaft 3 are rotated in the direction of an arrow 14 and, while on the other hand, when the hydraulic fluid under pressure is charged to the chambers 9 and 11 and discharged from the chambers 8 and 10, the vanes 4 and 5 and the shaft 3 are rotated in the direction of an arrow 15. A pair of connecting members 16 and 17 are secured at their one ends on both ends of the shaft 3 so as to put the casing 2 therebetween and to be in out of contact with the casing 2, and secured at their other ends to a shaft 18. The actuator 1, the connecting members 16 and 17 and the shaft 18 constitute a driving means. The shaft 18 passes through a cylindrical member 19 and the cylindrical member 19 is connected by way of bearings 20 and 21 to the shaft 18 so as to be rotatable with each other. A movable gear 23 is secured on one side of the cylindrical member 19 by means of screws 22. The bearing 20 is disposed between the inner circumferential surface of the gear 23 and the outer circumferential surface of the shaft 18. The gear 23 comprises a disc member having a cut-away portion 24. A stationary gear 26 is secured to one side of the casing 2 by means of screws 25 and meshes with the gear 23. The angular displacement of the shaft 3 causes the shaft 18 to swing by way of the connecting members 16 and 17 and, as the result, the gear 23 meshing with the gear 26 rotates around the gear 26 due to this swinging movement. The cylindrical member 19 is also rotated by this movement. A gear 28 is secured on one side of one connecting member 17 by means of screws 27 and the center axis of the gear 28 is aligned with that of the shaft 18. The gear 28 meshes with a gear 29. A pair of connecting members 30 and 31 are secured at their one ends to the cylindrical member 19 and secured at the other ends to a cylindrical member 32. A rotational shaft 33 passes through the cylindrical member 32, and the cylindrical member 32 and the shaft 33 are connected by way of bearings 34 and 35 so as to be rotatable with each other. The bearings 34 and 35 are disposed between the inner circumferential surface of the cylindrical member 32 and the outer circumferential surface of the shaft 33.

The gear 29 is secured to one end of the shaft 33 and a connecting member 36 is secured to the other end of the shaft 33. When the gear 29 conducts a planetary movement around the gear 28, the gear 29 and the shaft 33 perform the identical rotation and the connecting member 36 also swings in the same manner. A rotary actuator 37 similar to the rotary actuator 1 is mounted to the connecting member 36. A rotational shaft 39 similar to shaft 3 is projected from one end face of a casing 38 for the actuator 37 and the shaft 39 is rotated around a center line 40 as the center by the actuation of the actuator 37. A working tool such as a paint spray nozzle is attached to the shaft 39. A potentiometer 41 detects the rotation of the shaft 3 and a potentiometer 42 detects the rotation of the shaft 39 respectively each in electrical manner. The rotation of the shaft 3 is transmitted to the potentiometer 41 by way of gears 43 and 44. The gear 43 is secured to the rotational shaft 45 of the potentiometer 41 and the gear 44 meshing with the gear 43 is secured to the shaft 3. The potentiometer 41, the gears 43 and 44 are not shown in FIG. 1.

The manipulator arm 51 having such constitution can schematically be shown in view of its principle as in FIG. 4, and the operation of the arm 51 will be explained referring to FIG. 4. When hydraulic fluid under pressure is charged to the chambers 8 and 10, the shaft 3 is rotated in the direction of the arrow 14 and, simultaneously, the connecting members 16 and 17 and the gear 28 are rotated in the same direction around the shaft 3 as the center. In this case, the gear 23 goes around the gear 26 while meshing therewith and the shaft 18 is brought to a position 52. Upon movement of the shaft 18 to the position 52, the connecting members 30 and 31 are rotated in the direction of the arrow 14 around the shaft 18 to set the shaft 33 to a position 53. During movement of the shaft 33 to the position 53, the gear 29 goes around the gear while meshing therewith thus rotates in the direction of the arrow 14 around the shaft 33 as the center. Accordingly, the shaft 39 is set to a position 54, that is, it is positioned with an angle $\theta$ relative to the direction of the center line 40 for the arm 51 when it is extended straightly. In the case where the gear ratio (ratio of the pitch circle diameter) between each of the gears is set to 1:1, the angle $\theta$ is three times as large as an angle $\theta_0$ formed between the center line 40 and a straight line 55 that connects the position 52 with the center of the shaft 3. In the same manner, the shaft 39 can be set to positions 56 and 57 successively by further rotating the shaft 3 in the direction of the arrow 14. While on the other hand, if the shaft 3 is rotated in the direction of the arrow 15, the arm 51 can be bent in the manner opposite to that stated above. Thus, the arm 51 can be bent as desired by the charge and discharge of the hydraulic fluid to and from the actuator 1 thereby enabling to set the paint spray nozzle attached to the shaft 39 to a predetermined position. While on the other hand, upon charge and discharge of hydraulic fluid to and from the actuator 37, the shaft 39 can be rotated around the center line 40 as the center, whereby the nozzle attached to the shaft 39 can simultaneously be rotated as required around the center line 40 as the center. The degree of bending for the arm 51 and of the rotation for the nozzle attached to the shaft 39 can be detected electrically by the potentiometers 41 and 42 respectively.

While the above embodiment comprises four gears, this invention is not limited only to such an embodiment but may comprise 2, 3 or more than 5 gears. Further, it is not always necessary to set the gear ratio (pitch circle diameter of the gear) to 1:1 but any other gear ratio may be set optionally.

Figure 5:
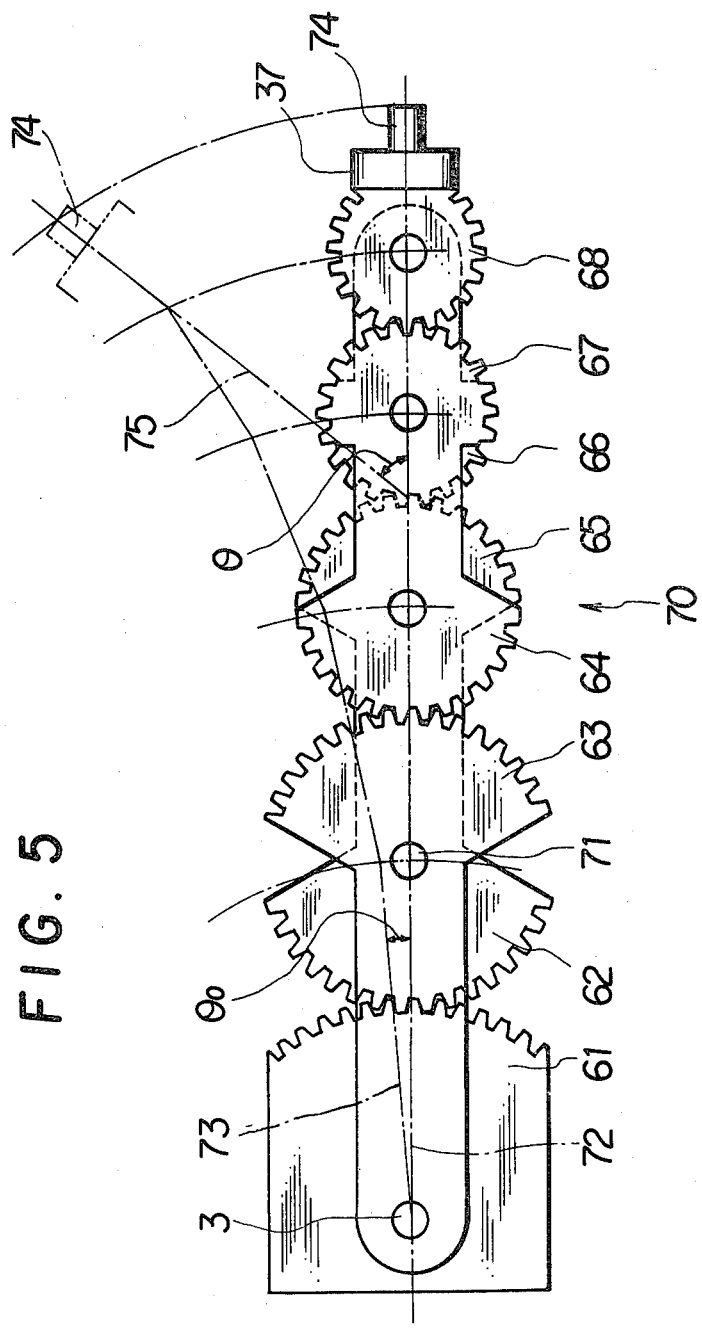
FIG. 5 is a side elevation view for another preferred embodiment of this invention.

As shown in the principle diagram in FIG. 5, a manipulator arm 70 may comprise eight gears 61 to 68 with the gear ratio changed successively between each of the meshing gears. In the embodiment shown in FIG. 5, if the gear size is made equal, that is, the gear ratio is set to 1:1 for each of the coaxial gear sets, that is, for gears 62, 63, gears 64, 65 and gears 66, 67, respectively and the gear ratio is set to 6:4:3:2.4:2 successively in the train of gears 61, 62, 64, 66 and 68, then movement of a rotational shaft 71 (which corresponds to the rotational shaft 18 in the previous embodiment) to a line 73 with an angle $\theta_0$ relative to a center line 72 can cause a shaft 74 (which corresponds the shaft 39 in the previous embodiment) to move to a line 75 with an angle $\theta$(equal to $10\theta_0$) relative to a center line 72.

Figure 4:
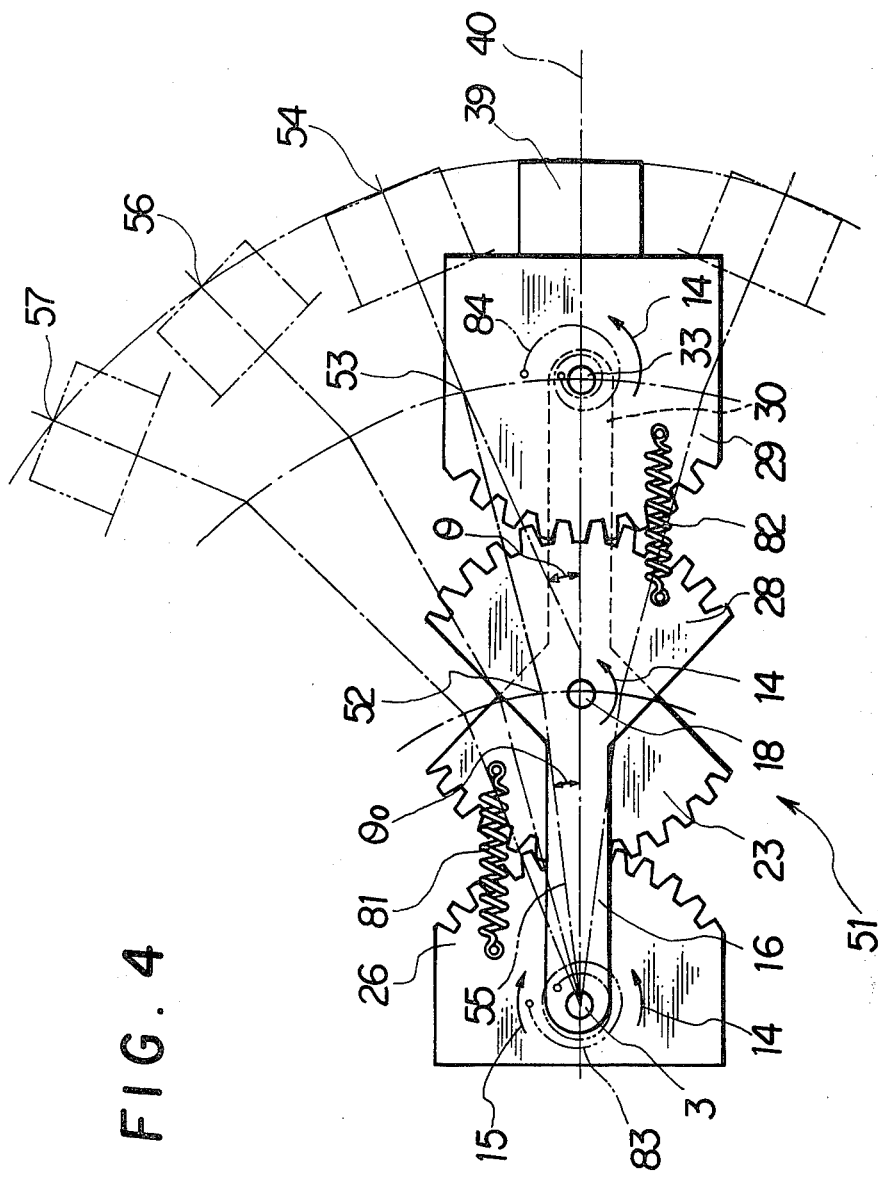
FIG. 4 is an explanatory view for the operation of the embodiment shown in FIG. 1.

Further, in order to decrease the backlashes in each of the gear meshing portions, springs 81 and 82 may be mounted between the gears 26 and 23 and between the gears 28 and 29 respectively to bias each of the gears in one rotational direction or, alternatively, spiral springs 83 and 84 may be mounted between the gear 26 and the connecting member 16 and between the connecting member 30 and the gear 29 respectively to bias each of the gears 28 and 23 in one rotational direction by these spiral springs as shown in FIG. 4. Referring to the actuator used in this invention, it may be a hydraulic cylinder of reciprocating type instead of the rotary type mentioned above. Furthermore, the application of this invention is not limited only to a coating robot as in the previous embodiment but it is also applicable for other uses such as a welding robot, in which a welding torch is attached as the working tool.

What is claimed is:

1. A manipulator arm comprising:
   a base member,
   a stationary gear secured to the base member,
   a first movable gear meshing with the stationary gear,
   a connecting member secured at one end thereof with the first movable gear,
   a first rotational shaft rotatably mounted on the other end of the connecting member,
   a second movable gear secured to the rotational shaft,
   a third movable gear meshing with the second movable gear,
   a second rotational shaft secured with the third movable gear and passing through the first movable gear,
   a working tool attached to the second movable gear, and
   a driving means for causing the first movable gear to move while meshing it with the stationary gear.

2. The manipulator arm of claim 1, in which the working tool is directly and fixedly attached to the second movable gear.

3. The manipulator arm of claim 1, further comprising an actuator for rotating the working tool, which is attached to the second movable gear by way of the actuator.

4. The manipulator arm of claim 1, in which each of the gears is biased by a spring in a predetermined direction in order to decrease the backlashes in the gear meshing portion.

5. A manipulator arm comprising a stationary first gear means, first connecting means rotatably mounted at one end thereof to the first gear means, a second gear means fixedly mounted to the other end of the first connecting means, a third gear means rotatably mounted to the second gear means and meshing with the first gear means, second connecting means fixedly mounted at one end thereof to the third gear means, a fourth gear means rotatably mounted to the other end of said second connecting means and meshing with the second gear means, and an actuator means for rotating the first connecting member.

6. The manipulator arm of claim 5, in which the actuator means comprises a cylindrical casing, a rotational shaft passing through the cylindrical casing, movable partition members secured to the rotational shaft for dividing the inner space of the cylindrical casing into two chambers, and stationary partition members secured to the cylindrical casing for further dividing each of the two chambers divided by the movable partition members into two chambers respectively, the first gear means is fixedly mounted to the cylindrical casing and the first connecting means are secured at one end thereof to the rotational shaft.

7. The manipulator arm of claim 5, in which a fifth gear means is further secured to the other end of the second connecting means, a third connecting means is connected fixedly at one end thereof to the fourth gear means, and a sixth gear means is rotatably mounted to the other end of the third connecting means.

8. The manipulator arm of claim 5, in which the gear ratio between each of the first to fourth gear means is identical.

9. The manipulator arm of claim 7, in which the gear ratio of the second to the third gear means and of the fourth to the fifth gear means is one, the gear ratio of the first gear means to the third gear means being greater than one and the gear ratio of the second gear means to the fourth gear means being greater than one.

* * * * *